United States Patent Office 3,036,042
Patented May 22, 1962

3,036,042
PREPARATION OF POLYURETHANES
Karl-Ludwig Schmidt, Erwin Müller, Otto Bayer, and Kurt Genski, Leverkusen, and Julius Peter, Odenthal, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Apr. 3, 1958, Ser. No. 726,624
Claims priority, application Germany Apr. 9, 1957
4 Claims. (Cl. 260—75)

This invention relates generally to rubber-like plastics and more particularly to an improved method for making substantially nonporous, rubber-like polyurethanes.

It has been proposed heretofore to prepare a substantially nonporous, rubber-like polyurethane by reacting a saturated linear polyester having terminal hydroxyl groups with an organic diisocyanate and thereafter reacting the resulting intermediate having terminal NCO groups with a suitable cross-linking agent, such as a diamine or a polyhydroxy compound. In one form of this process, the linear polyester is mixed with an excess of organic diisocyanate over that required to react with all of the hydroxyl groups of the polyester and the resulting intermediate having terminal NCO groups is reacted with at least enough unsaturated compound having terminal hydroxyl groups to react with all terminal NCO groups. In a variation of this process, an unsaturated polyhydroxy compound is used instead of a saturated polyester. As in the other embodiments, an excess of organic diisocyanate is used and sufficient dihydroxy compound is used as a cross-linker to react with all of the terminal NCO groups of the intermediate compound. In still another variation of the process, an unsaturated diisocyanate is used.

The product obtained from each of the foregoing processes is a horn-like or elastic product which is soluble in most organic solvents and can be cross-linked to form an insoluble product by polymerization with a vinyl compound or with sulfur. It has been also proposed to prepare a millable gum by reacting a polyhydroxy compound such as a polyester with an excess of organic diisocyanate to prepare a prepolymer which is then reacted with a cross-linking agent, such as a glycol much like the process described above. This product is then placed on a rubber mill and the terminal hydroxyl groups of the prepolymer is reacted with additional diisocyanate to form a rubber-like insoluble cross-linked product. This process has the disadvantage of exposing personnel to isocyanates and the product has a tendency to become hot as it is flexed which deleteriously effects the physical properties of the product.

It is therefore an object of this invention to provide a method for making an improved polyurethane. Another object of the invention is to provide an improved method for making polyurethanes suitable for making rubber-like articles, such as vehicle tires and the like. A further object of the invention is to provide an improved process for making a cross-linked, rubber-like, substantially nonporous polyurethane.

In accordance with this invention, generally speaking, the foregoing objects and others are accomplished by reacting an organic compound having at least two hydrogen atoms, a molecular weight of at least about 1,000 and an hydroxyl number of not more than about 112 with an excess of an organic polyisocyanate over that required to react with all of the reactive hydrogen atoms and with a dihydroxy cross-linking agent in an amount at least sufficient to react with all the NCO groups of the reaction product obtained from the organic compound having reactive hydrogen atoms and the organic polyisocyanate.

The resulting millable gum is then worked on a suitable mill, such as a rubber-roller with an organic peroxide until a cross-linked insoluble product is obtained. The millable gum may be prepared by any conventional method, such as, for example, by the process described in German Patent 955,995. The product is then placed on a mill and processed with the organic peroxide.

Any suitable organic compound having at least two hydrogen atoms which will react with an NCO group to form urethane linkages may be used. Examples of such compounds include polyesters prepared by esterification of a dicarboxylic acid and a glycol, polyalkylene ethers having terminal hydroxyl groups, such as the polyethers prepared by condensation of an alkylene oxide or the polymers of tetrahydrofuran having terminal hydroxyl groups, polythioethers having terminal hydroxyl groups prepared by condensation of a thioglycol, such as dithioglycol, polyacetals such as prepared by reaction of formaldehyde with a glycol, and the like. These compounds, however, must have a molecular weight of at least about 1,000.

Any suitable organic polyisocyanate such as for example, 2,4-toluylene diisocyanate, 2,6-toluylene diisocyanate, 4,4'-diphenylmethane diisocyanate, p-phenylene diisocyanate, 1,5-naphthylene diisocyanate, m-phenylene-diisocyanate, diphenyl-4,4'-diisocyanate, azobenzene-4,4'-diisocyanate, diphenylsulphone-4,4'-diisocyanate, bis-(3-isocyanatobenzoic acid)-diethylene glycol ester, 1-isopropylbenzene-3,5-diisocyanate, dicyclohexylmethane-4,4'-diisocyanate, tetramethylene diisocyanate, and hexamethylene diisocyanate and the like may be used.

The compound used as a cross-linking agent or chain extender may be either a saturated dihydroxy compound or an unsaturated dihydroxy compound. Any suitable compound of this type including 1,4-butenediol, butenedihydroxyethyl glycol, butynediol, butynedihydroxyethyl glycol, dihydromuconic acid, maleic acid, fumaric acid, esters which contain hydroxyl groups, such as dihydroxyethyl maleate, beta-dihydroxyethyl dihydromuconate and dihydroxyethyl fumarate, polyesters which are of low molecular weight and contain hydroxyl groups, beta-hydroxyethyl amides of fumaric acid or dihydromuconic acid and the like may be utilized. Other suitable cross-linking agents include 1,3-butanediol, 1,4-butanediol, hydroquinone-beta-diethyl ether, quinitol, 4,4'-dihydroxy-dicyclohexyl-dimethyl methane, 4,4'-dihydroxy dicyclohexyl methane, 3,3'-dichloro-4,4'-diamino-diphenyl methane, 3,3' dichloro benzidine and N,N' dimethyl-4,4'-diamino-diphenyl methane.

Any suitable organic peroxide may be used in the cross-linking step including for example, dicumyl peroxide, benzoyl peroxide, cyclohexanone hydroperoxide, methylethyl-ketone peroxide, cumene hydroperoxide, diacetyl peroxide, succinyl peroxide, and the like. Dicumyl peroxide has been found to be particularly advantageous and is preferred.

It has been found that best results are obtained when from about 1 percent to about 10 percent by weight organic peroxide is used. The peroxide may be used as a paste or powder and the paste may be prepared by mixing the peroxide with any of the conventional compounding agents used heretofore, such as for example, calcium carbonate, dibutyl phthalate or the like.

The organic peroxides may be incorporated at room temperature on mixing devices, for example, rubber mixing rollers or worm presses, into the isocyanate-modified condensation and/or polymerization products, and fillers (for example carbon black), or lubricants (for example stearic acid), can be incorporated simultaneously. The cross-linking reaction is then carried out at elevated temperatures, preferably between 120° and 160° C., preferably by pressing and with simultaneous shaping. Times of from about 15 minutes up to about 1 hour are generally suitable.

By comparison with the initially described cross-linking of known type with vinyl compounds, the process of the invention yields plastics of high molecular weight with better mechanical properties, the substantially higher degree of elasticity being particularly worthy of attention. Moreover the product can be flexed without any material deleterious effect on the physical properties thereof.

The disadvantages of the aforementioned sulfur vulcanisation, namely a cold flow of the resultant plastics which is often apparent, and their higher permanent elongation, are avoided by the cross-linking process of this invention. Furthermore, additional accelerators and promoters are required in the sulfur vulcanisation in order to produce a vulcanisation or cross-linking process which can be used in practice.

*Example 1*

About 100 parts by weight of an adipic acid-ethylene glycol polyester with an OH number of about 56 are dehydrated for about 30 minutes at about 135° C. in vacuo in a stirrer-type vessel. About 13.6 parts of p-phenylene diisocyanate are added and allowed to react for about 10 minutes at about 125° C. About 3.5 parts by weight of butenediol are then incorporated by stirring and the mixture quickly becomes viscous. It is poured on to sheet metal plates and heated for about 24 hours at about 110° C. A rubber-like initial condensate which is soluble in acetone and which has a Defo hardness of about 50/80° C., is obtained.

About 100 parts by weight of this initial condensate are thoroughly mixed on a rubber roller with about 0.5 part by weight of stearic acid and about 2 parts by weight of dicumyl peroxide and drawn out as a smooth sheet. This is vulcanized for about 120 minutes at about 150° C. in a press. A vulcanization with the following mechanical values is obtained:

Tensile strength_____kg./cm.$^2$__ 213
Breaking elongation_____percent__ 670
Rebound elasticity_____do____ 42
Shore hardness_____ 44°
Permanent elongation_____percent__ 6

*Example 2*

About 100 parts of a polyester obtained from adipic acid and ethylene glycol and 1,2-propylene glycol in the ratio of 70:30, the said polyester having a hydroxyl number of 50, are dehydrated in vacuo in a stirrer-type vessel at about 135° C. for 30 minutes. About 20 parts by weight of the addition product of 1 mol of butenediol and 2 mols of 2,4-toluylene diisocyanate are thereafter added at 90° C. and the mixture stirred for another 50 minutes at this temperature. The mixture is then poured on to sheet metal plates and heated for about 10 hours at 100° C.

About 100 parts by weight of this initial condensate are thoroughly mixed on a rubber roller with about 30 parts by weight of active carbon black, about 1 part by weight of stearic acid and about 2 parts by weight of dicumyl peroxide and rolled out to form a sheet. This is vulcanized in a press for about 30 minutes at 151° C. The vulcanizate obtained has the following mechanical properties:

Tensile strength_____kg./cm.$^2$__ 220
Breaking elongation_____percent__ 300
Rebound elasticity_____do____ 32
Shore hardness_____ 60°
Permanent elongation_____percent__ 6

*Example 3*

In another embodiment, about 100 parts by weight of the condensate of Example 2 are thoroughly mixed on a rubber roller with about 30 parts by weight of silicic acid aerogel, about 1 part by weight of stearic acid and about 1.5 parts by weight of tertiary butyl perbenzoate and rolled out to form a sheet. This is vulcanized in a press for 20 minutes at 150° C. The vulcanizate obtained has the following mechanical properties:

Tensile strength_____kg./cm.$^2$__ 170
Breaking elongation_____percent__ 470
Rebound elasticity_____do____ 27
Shore hardness_____ 62°
Permanent elongation_____percent__ 8
Ring structure_____kg. abs./4 mm.__ 12

*Example 4*

In still another embodiment, about 100 parts by weight of the condensate of Example 2 are thoroughly mixed on a rubber mill with about 35 parts by weight of activated carbon black and about 1.5 parts by weight of 2,2'-bis-(tertiary butyl peroxy)-butane and rolled out to form a sheet. This is vulcanized in a press for about 10 minutes at 150° C. The vulcanizate obtained has the following mechanical properties:

Tensile strength_____kg./cm.$^2$__ 130
Breaking elongation_____percent__ 450
Rebound elasticity_____do____ 27
Shore hardness_____ 65°
Permanent elongation_____percent__ 12
Ring structure_____kg. abs./4 mm.__ 10

*Example 5*

About 100 parts by weight of polybutylene glycol with a hydroxyl number of 40 are dehydrated in vacuo for 30 minutes at 135° C. in a stirrer-type vessel. About 9.3 parts by weight of toluylene diisocyanate are added thereto at 130° C. and reaction is allowed to take place for 30 minutes at 130° to 135° C. About 100 parts by weight of a dihydromuconic acid ethylene glycol ester with a hydroxyl number of 172 are then incorporated by stirring, allowed to react for 8 minutes, by which time the mixture has become fairly viscous, then poured on to sheet metal plates and heated for 12 hours at 100° C.

About 100 parts by weight of the initial condensate obtained in this manner are mixed on a rubber roller with about 30 parts by weight of active carbon black, about 1 part by weight of stearic acid and about 2 parts by weight of dicumyl peroxide and drawn out as a sheet. Similar results are obtained when 1.5 parts by weight of tertiary butyl perbenzoate or 2 parts by weight of 2,2'-bis-(tertiary butyl peroxy)-butane are employed instead of dicumyl peroxide. This sheet is vulcanized for 30 minutes at 151° C. in a press. The vulcanizate obtained has the following mechanical values:

Tensile strength_____kg./cm.$^2$__ 220
Breaking elongation_____percent__ 300
Rebound elasticity_____do____ 32
Shore hardness_____ 60°
Permanent elongation_____percent__ 6

*Example 6*

About 900 parts by weight of a polyester prepared by thermal condensation from adipic acid and ethylene glycol and 1,2-propylene glycol (the glycols being employed in the ratio of 70:30), the said polyester having a hydroxyl number of 56 are dehydrated in vacuo in a stirrer-type vessel at 130° C. for one hour. About 18 parts by weight of butenediol are admixed with the polyester and when the temperature rises to 100° C. about 114 parts by weight of toluylene diisocyanate are added to the reaction mixture. During the addition of the diisocyanate the temperature rises to about 150° C. After stirring for 1 to 2 minutes the mixture is poured onto sheet metal plates and heated for 12 hours at 100° C. A thermoplastic material is obtained which can easily be processed on a rubber mill.

About 100 parts of this intermediate are thoroughly mixed on a rubber mill with about 30 parts by weight of active carbon black, about 1 part by weight of stearic acid and about 4 parts by weight of powdered dicumyl peroxide (40%) and rolled out to form a sheet. Instead of about 30 parts by weight of active carbon black about 20 parts by weight of silicic acid aerogel can be employed. This is vulcanized in a press for 30 minutes at 150° C. The vulcanizate obtained has the following mechanical properties:

Tensile strength_____kg./cm.$^2$__ 278
Breaking elongation_____percent__ 430
Rebound elasticity_____do____ 44
Shore hardness_____ 60°
Permanent elongation_____percent__ 5
Ring structure_____kg. abs./4 mm__ 12

Example 7

About 900 parts by weight of a polyester prepared by thermal condensation from adipic acid and ethylene glycol and 1,2-propylene glycol (the glycols being employed in the ratio of 70:30), the said polyester having a hydroxyl number of 56 are dehydrated in vacuo in a stirrer-type vessel at 130° C. for one hour. About 164 parts by weight of 4,4'-diphenyl methane diisocyanate are admixed with the polyester at this temperature which then rises to about 150° C. After 3 minutes about 18 parts by weight of butenediol are added. The reaction mixture is stirred for another 2 minutes and then poured onto sheet metal plate and heated for 12 hours at 100° C. A thermoplastic material is obtained having a Defo-hardness of 1900/80° and a Defo-elasticity of 33/80°.

About 100 parts by weight of this intermediate are thoroughly mixed on a rubber mill with about 30 parts by weight of active carbon black and about 4 parts by weight of powdered dicumyl peroxide (40%) and rolled out to form a sheet. This is vulcanized in a press for 30 minutes at 150° C. The vulcanizate obtained has the following properties:

Tensile strength_____kg./cm.$^2$__ 240
Breaking elongation_____percent__ 640
Rebound elasticity_____do____ 41
Shore hardness_____ 55°
Permanent elongation_____percent__ 13
Ring structure_____kg. abs./4 mm__ 10

Example 8

About 900 parts by weight of a polyester prepared by thermal condensation from adipic acid and ethylene glycol and 1,2-propylene glycol (the glycols being employed in the ratio of 70:30), the said polyester having a hydroxyl number of 56 are dehydrated in vacuo in a stirrer-type vessel at 130° C. for one hour. About 18 parts by weight of butene diol are admixed with the polyester and after thoroughly stirring about 113 parts by weight of hexamethylene diisocyanate are added to the reaction mixture. During this operation temperature rises to 140° C. After 5 minutes the mixture is poured onto sheet metal plates and heated for 12 hours at 100° C. A thermoplastic material is thus obtained which can easily be processed on a rubber mill.

About 100 parts of this intermediate are thoroughly mixed on a rubber mill with about 30 parts by weight of active carbon black, about 1 part by weight of stearic acid and about 4 parts by weight of powdered dicumyl peroxide (40%) and rolled out to form a sheet. This is vulcanized in a press for 30 minutes at 150° C. The vulcanizate obtained has the following mechanical properties:

Tensile strength_____kg./cm.$^2$__ 270
Breaking elongation_____percent__ 420
Rebound elasticity_____do____ 46
Shore hardness_____ 74°
Permanent elongation_____percent__ 5
Ring structure_____kg. abs./4 mm__ 13

Example 9

About 300 parts by weight of a polyester prepared by thermal condensation of adipic acid, ethylene glycol and 1,2 propylene glycol (the glycols being employed in the ratio of 70:30), the said polyester having a hydroxyl number of 52 are dehydrated in vacuo in a stirrer-type vessel at 130° C. for half an hour. About 32 parts by weight of toluylene diisocyanate are admixed with the polyester. The temperature rises during this operation to 148° C. After 10 minutes 15 parts by weight of a fumaric acid glycol ester having an OH number of 360 are added. The mixture is stirred for another 3 minutes and then poured onto sheet metal plates and heated for 12 hours at 100° C. A thermoplastic material is thus obtained having a Defo-hardness of 280/80° C. and a Defo-elasticity of 37/80° C.

About 100 parts by weight of this intermediate are thoroughly mixed on a rubber mill with about 30 parts by weight of active carbon black and about 4 parts by weight of powdered dicumyl peroxide (40%) and rolled out to form a sheet. Instead of 4 parts by weight of powdered dicumyl peroxide it is possible to employ about 1.5 parts by weight of ditertiary butyl peroxide. This is vulcanized in a press for 30 minutes at 150° C. The vulcanizate obtained has the following mechanical properties:

Tensile strength_____kg./cm.$^2$__ 233
Breaking elongation_____percent__ 340
Rebound elasticity_____do____ 41
Shore hardness_____ 61°
Permanent elongation_____percent__ 4
Ring structure_____kg. abs./4 mm__ 11

Example 10

About 900 parts by weight of a polyester prepared by thermal condensation from adipic acid and ethylene glycol and 1,2-propylene glycol (the glycols being employed in the ratio of 70:30), the said polyester having a hydroxyl number of 56 are dehydrated in vacuo in a stirrer-type vessel at 130° C. for one hour. About 45 parts by weight of a fumaric acid glycol ester having an OH number of 360 and then about 146 parts by weight of 4,4'-diphenyl methane diisocyanate are added, the temperature rising during this operation to about 150° C. After stirring for another 3 minutes the reaction mixture is poured onto sheet metal plates and heated for 12 hours at 100° C. A thermoplastic material is then obtained having a Defo-hardness of 1350/80° C. and a Defo-elasticity of 44/80° C.

About 100 parts by weight of this intermediate are thoroughly mixed on a rubber mill with about 30 parts by weight of active carbon black, about 1 part by weight of stearic acid and about 4 parts by weight of powdered dicumyl peroxide (40%) and rolled out to form a sheet. This is vulcanized in a press for 30 minutes at 150° C. The vulcanizate obtained has the following mechanical properties:

Tensile strength_____kg./cm.$^2$__ 240
Breaking elongation_____percent__ 330
Rebound elasticity_____do____ 35
Shore hardness_____ 61°
Permanent elongation_____percent__ 5
Ring structure_____kg. abs./4 mm__ 11

Example 11

About 900 parts by weight of a polyester prepared by thermal condensation from adipic acid and ethylene glycol and 1,2-propylene glycol (the glycols being employed in the ratio of 70:30), the said polyester having a hydroxyl number of 56 are dehydrated in vacuo in a stirrer-type vessel at 130° C. for one hour. About 45 parts by weight of a bicycloheptene dicarboxylic acid glycol ester having an OH number of 360 and then about 94 parts by weight of hexamethylene diisocyanate are added, the temperature rising during this operation to about 140 to 145° C. After stirring for another 5 minutes the mixture is poured onto sheet metal plates and heated for 12 hours at 100° C. The thermoplastic material thus obtained has a Defo-hardness of 180/80° C. and a Defo-elasticity of 35/80° C.

About 100 parts of this intermediate are thoroughly mixed on a rubber mill with about 30 parts by weight of active carbon black, about 1 part by weight of stearic acid and about 4 parts by weight of powdered dicumyl peroxide (40%) and rolled out to form a sheet. Instead of active carbon black about 25 parts by weight of silicic acid aerogel can be employed. This is vulcanized in a press for 30 minutes at 150° C. The vulcanizate obtained has the following mechanical properties:

| | |
|---|---|
| Tensile strength_____kg./cm.$^2$__ | 170 |
| Breaking elongation_____percent__ | 220 |
| Rebound elasticity_____do____ | 40 |
| Shore hardness_____ | 85° |
| Permanent elongation_____percent__ | 5 |
| Ring structure_____kg. abs./4 mm__ | 12 |

*Example 12*

About 1000 parts by weight of polybutylene glycol (OH number 43) are dehydrated in vacuo in a stirrer-type vessel at 130° C. for one hour. About 200 parts by weight of the addition product of 1 mol of butene diol and 2 mols of 2,4-toluylene diisocyanate are thereafter added and the mixture stirred for another 10 minutes. The mixture is then poured onto sheet metal plates and heated for 24 hours at 100° C. The thermoplastic material thus obtained has a Defo-hardness of 375/80° C. and a Defo-elasticity of 22/80° C.

About 100 parts by weight of this intermediate are thoroughly mixed on a rubber mill with about 30 parts by weight of active carbon black and about 4 parts by weight of powdered dicumyl peroxide (40%) and rolled out to form a sheet. This is vulcanized in a press for 30 minutes at 150° C. The vulcanizate obtained has the following:

| | |
|---|---|
| Tensile strength_____kg./cm.$^2$__ | 180 |
| Breaking elongation_____percent__ | 315 |
| Rebound elasticity_____do____ | 59 |
| Shore hardness_____ | 67° |
| Permanent elongation_____percent__ | 2 |
| Ring structure_____kg. abs./4 mm__ | 8 |

*Example 13*

About 1,000 parts by weight of an adipic acid-ethylene glycol polyester having an hydroxyl number of 56 are dehydrated for one hour at 130° C. in an agitated vessel under vacuum from a water jet. Following this, about 20 parts by weight 1,4-butanediol are added and, as soon as they are well mixed in, about 181 parts by weight 4,4'-diphenyl methane-diisocyanate are added. Thereupon the temperature will climb to approximately 150° C. Agitation is continued for another 3 minutes, and then the mass is poured into trays and heated in a drying oven for about 12 hours at 100° C. The result is a thermoplastic material with a Defo hardness of 1500/80° and a Defo elasticity of 29/80°.

About 100 parts by weight of this material are mixed on a mill with about 30 parts by weight pulverized activated carbon, about 1 part by weight stearic acid and about 8 parts by weight puverized dicumyl peroxide (40%) and drawn out into a smooth sheet. This is vulcanized for 30 minutes at 150° C. The vulcanized material has the following physicals:

| | |
|---|---|
| Tensile strength_____kg./cm.$^2$__ | 381 |
| Breaking elongation_____percent__ | 475 |
| Shore hardness_____ | 65° |
| Rebound elasticity_____percent__ | 46 |
| Ring structure_____kg. abs./4 mm__ | 26 |
| Permanent elongation after 1 minute___percent__ | 6 |

A similar material is obtained by using 3 parts by weight of ditertiary-butyl peroxide instead of the dicumyl peroxide.

*Example 14*

In the same manner as described in Example 13, a thermoplastic material is produced from about 1,000 parts by weight of an adipic acid-propylene glycol polyester (hydroxyl number 56), about 15 parts by weight butanediol, about 5 parts by weight butenediol and about 198 parts by weight 4,4'-diphenyl methane diisocyanate. The product has a Defo hardness of 2500/80°, and a Defo elasticity of 29/80°.

After mixing 100 parts by weight of this material with about 30 parts by weight of pulverized activated carbon and about 4 parts by weight of pulverized dicumyl peroxide (40%) and vulcanizing for 30 minutes at 150° C. as in Example No. 13, a vulcanized product is obtained with the following mechanical properties:

| | |
|---|---|
| Tensile strength_____kg./cm.$^2$__ | 224 |
| Breaking elongation_____percent__ | 740 |
| Shore hardness_____ | 59° |
| Rebound elasticity_____percent__ | 36 |
| Ring structure_____kg. abs./4 mm__ | 17 |
| Permanent elongation after 1 minute___percent__ | 15 |

*Example 15*

In the same manner as outlined under Example 13, a thermoplastic material is produced from about 1,000 parts by weight of an adipic acid-ethylene glycol-propylene glycol polyester (hydroxyl No. 56; glycol ratio 1:1) about 15 parts by weight butanediol, about 5 parts by weight butenediol and about 187 parts by weight 4,4'-diphenyl methane-diisocyanate. The product has a Defo hardness of 1550/80° and a Defo elasticity of 30/80°.

After mixing about 100 parts by weight of this material with about 25 parts by weight of pulverized activated carbon, about 1 part by weight of stearic acid and about 4 parts by weight of pulverized dicumyl peroxide (40%) and vulcanizing the mass under the conditions of Example 13, a vulcanized product is obtained with the following mechanical properties:

| | |
|---|---|
| Tensile strength_____kg./cm.$^2$__ | 235 |
| Breaking elongation_____percent__ | 665 |
| Shore hardness_____ | 60° |
| Rebound elasticity_____percent__ | 39 |
| Ring structure_____kg. abs./4 mm__ | 15 |
| Permanent elongation after 1 minute___percent__ | 12 |

If about 30 parts by weight of silicic acid aerogel is used instead of the activated carbon, a material with similar properties is obtained.

*Example 16*

In the same manner as outlined under Example 13, a thermoplastic material is produced from about 900 parts by weight adipic acid-ethylene glycol-propylene glycol polyester (hydroxyl No. 56; ethylene glycol-propylene glycol ratio 7:3), about 18 parts by weight butanediol, and about 160 parts by weight 4,4'-diphenyl methane diisocyanate. The product has a Defo hardness of 1175/80° and a Defo elasticity of 36/80°. After mixing about 100 parts by weight of this material with about 30 parts by weight of pulverized activated carbon and about 8 parts by weight pulverized dicumyl peroxide (40%) and vulcanizing the mass under the conditions of Example 13, a vulcanized product is obtained with the following mechanical properties:

| | |
|---|---|
| Tensile strength_____ | 348 |
| Breaking elongation_____ | 490 |
| Shore hardness_____ | 64 |
| Rebound elasticity_____ | 43 |
| Ring structure_____ | 8 |
| Permanent elongation after 1 minute_____ | 8 |

Example 17

In the same manner as outlined under Example 13, a thermoplastic material is produced from about 1,000 parts by weight of adipic acid-ethylene glycol-polyester (hydroxy No. 56) about 20 parts by weight butanediol-1,3, and about 125 parts by weight tolylenediisocyanate. The product has a Defo hardness of 2550/80° and a Defo elasticity of 38/80°. After mixing about 100 parts by weight of this material with about 30 parts by weight of pulverized activated carbon, about 1 part by weight stearic acid and about 8 parts by weight pulverized dicumyl peroxide and vulcanizing the mass under the conditions of Example 13, a vulcanized product is obtained with the following mechanical properties:

| | |
|---|---|
| Tensile strength | 180 |
| Breaking elongation | 345 |
| Shore hardness | 64 |
| Rebound elasticity | 41 |
| Ring structure | 11 |
| Permanent elongation after 1 minute | 16 |

Example 18

In the same manner as outlined under Example 13, a thermoplastic material is produced from about 1,000 parts by weight of an adipic acid-ethylene glycol polyester (hydroxyl No. 56), about 20 parts by weight of butanediol and about 191 parts by weight of 4,4'-dicyclohexylmethane-diisocyanate. The product has a Defo hardness of 2450/80° and a Defo elasticity of 53/80°. After mixing about 100 parts by weight of this material with about 35 parts by weight of pulverized activated carbon and about 8 parts by weight of pulverized dicumyl peroxide (40%), and vulcanizing the mass under the conditions of Example 13, a vulcanized product is obtained with the following mechanical properties:

| | |
|---|---|
| Tensile strength | 182 |
| Breaking elongation | 345 |
| Permanent elongation after 1 minute | 7 |

A similar material is obtained by using about 2 parts by weight of tertiary butylhydroperoxide instead of the dicumyl peroxide.

Example 19

About 500 parts by weight of polybutylene glycol (hydroxyl No. 43) are dehydrated for one-half hour at 130° C. under vacuum in an agitated vessel. To this about 74 parts by weight of toluylene diisocyanate are added. The mass is allowed to react for 15 minutes, after which about 50 parts by weight of 4,4'-dihydroxy-dicyclohexyl-dimethyl methane are added. Agitation is continued for another 3 minutes and then the mass is poured into trays. After heating in a drying oven for 12 hours at 100° C. a thermoplastic material is obtained with a Defo hardness of 2000/80°, and a Defo elasticity of 36/80°.

After mixing about 100 parts of this material with about 30 parts by weight of pulverized activated carbon, about 1 part by weight of stearic acid and about 8 parts by weight of dicumyl peroxide (40%) and vulcanizing the mass under the conditions of Example 13, a vulcanized product is obtained with the following mechanical properties:

| | |
|---|---|
| Tensile strength | 136 |
| Breaking elongation | 460 |
| Shore hardness | 54 |
| Rebound elasticity | 43 |
| Ring structure | 8 |
| Permanent elongation after 1 minute | 7 |

Example 20

About 1,000 parts by weight adipic acid-ethylene glycol polyester having an hydroxyl number of about 56 is mixed with about 50 quarts quinitol after the polyester has been dehydrated by heating to a temperature of about 130° C. About 162 parts, 2,4 toluylene diisocyanate are added and after chemical reaction the resulting product has a Defo-hardness of about 2,850 at 80° and a Defo elasticity of 46 at 80°.

About 100 parts of the product is mixed with about 30 parts pulverized activated carbon, about 1 part stearic acid and about 8 parts dicumyl peroxide. The mixtures processed on a rubber mill for about 30 minutes at about 150° C. The resulting product has the following properties:

| | |
|---|---|
| Tensile strength | 129 |
| Elongation at break | 345 |
| Shore hardness | 64 |
| Elasticity | 31 |
| Ring structure | 9 |
| Permanent elongation after 1 minute | 12 |

Example 21

About 1,000 parts by weight adipic acid-propylene glycol polyester having an hydroxyl number of about 56 is mixed with about 50 parts hydroquinone-β-diethyl ether after the polyester has been dehydrated by heating to a temperature of about 130° C. About 202 parts, 4,4'-diphenylmethane-diisocyanate are added and after chemical reaction the resulting product has a Defo-hardness of about 2,850 at 80° and a Defo elasticity of 46 at 80°.

About 100 parts of the above material is mixed with about 30 parts activated carbon, pulverized, about 1 part stearic acid and about 8 parts dicumyl peroxide, pulverized (40%). The mixtures processed on a rubber mill for about 30 minutes at about 150° C. The resulting product has the following mechanical properties:

| | |
|---|---|
| Tensile strength | 145 |
| Breaking elongation | 574 |
| Shore hardness | 70 |
| Elasticity | 36 |
| Ring structure | 22 |
| Permanent elongation after 1 minute | 19 |

Example 22

About 1,000 parts by weight adipic acid-ethylene glycol-polyester having an hydroxyl number of about 56 is mixed with about 15 parts butanediol and 5 parts butenediol after the polyester has been dehydrated by heating to a temperature of about 130° C. About 125 parts 2,4 toluylene diisocyanate are added and after chemical reaction the resulting product has a Defo hardness of about 700 at 80° and a Defo elasticity of 24 at 80°.

About 100 parts of the above mixture is mixed with about 30 parts pulverized activated carbon, about 1 part stearic acid and about 8 parts pulverized dicumyl peroxide. The mixtures processed on a rubber mill for about 30 minutes at about 150° C. The resulting product has the following mechanical properties:

| | |
|---|---|
| Tensile strength | 330 |
| Breaking elongation | 390 |
| Shore hardness | 79 |
| Elasticity | 41 |
| Permanent elongation after 1 minute | 2 |

Example 23

About 1000 parts by weight adipic acid ethylene glycol propylene glycol polyester having an hydroxyl number of about 59 and a glycol ratio of 7:3 is mixed with about 15 parts butanediol and about 5 parts butenediol after the polyester has been dehydrated by heating to a temperature of about 130° C. About 129 parts 2,4-toluylene diisocyanate are added and after chemical reaction the resulting product has a Defo hardness of about 5000 at 50° and a Defo elasticity of 50 at 50°.

About 100 parts of the above mixture is mixed with about 25 parts pulverized activated carbon, about 1 part stearic acid and about 8 parts pulverized dicumyl peroxide (40%). The mixtures processed on a rubber mill for about 30 minutes at about 150° C. The resulting product has the following properties:

| | |
|---|---|
| Tensile strength | 305 |
| Elongation at break | 435 |
| Shore hardness | 60 |
| Elasticity | 44 |
| Permanent elongation after 1 minute | 3 |

The product of this invention has been found to be useful for making vehicle tires and various rubber-like machine parts.

The "Defo Hardness" and the "Defo Elasticity" indicated in the foregoing examples have been measured according to the DIN 53514.

Although the invention has been described in considerable detail for the purpose of illustration, it is to be understood that variations can be made therein by those skilled in the art without departing from the spirit of the invention and the scope of the claims.

What is claimed is:

1. A method for making a rubber-like polyurethane which comprises reacting an organic compound containing active hydrogen containing groups, a molecular weight of at least 1000, an hydroxyl number of less than 112 and selected from the group consisting of hydroxyl terminated polyesters of polyhydric alcohols and polycarboxylic acids and polyhydric polyalkylene ethers with an excess of an organic polyisocyanate and a quantity of a glycol having a molecular weight substantially less than 1000 at least sufficient to react with all of the —NCO groups present, said compounds being free from any carbon to carbon unsaturation other than aromatic, milling the resulting millable gum with from about 1 to about 10 percent by weight of an organic peroxide as the sole curing agent, pressing said gum into a mold having the desired configuration and curing it at a temperature of from about 120° C. to about 160° C.

2. The process of claim 1 wherein said peroxide is dicumyl peroxide.

3. The process of claim 1 wherein said organic compound having hydrogen atoms is a polyester prepared by esterification of a dicarboxylic acid and a glycol.

4. The process of claim 1 wherein the organic compound containing hydrogen atoms is a polyalkylene ether glycol.

References Cited in the file of this patent

UNITED STATES PATENTS

| | | |
|---|---|---|
| 2,431,921 | Cook et al. | Dec. 2, 1947 |
| 2,621,166 | Schmidt et al. | Dec. 9, 1952 |
| 2,625,531 | Seeger | Jan. 13, 1953 |
| 2,625,532 | Seeger | Jan. 13, 1953 |
| 2,734,045 | Nelson | Feb. 7, 1956 |
| 2,806,835 | Nischk et al. | Sept. 17, 1957 |
| 2,906,738 | Goldberg | Sept. 29, 1959 |

FOREIGN PATENTS

| | | |
|---|---|---|
| 748,697 | Great Britain | May 9, 1956 |
| 776,979 | Great Britain | June 12, 1957 |
| 863,403 | Germany | Jan. 10, 1953 |
| 1,000,998 | Germany | Jan. 17, 1957 |
| | (KL 39C 6) | |